M. CAHILL.
AUTOMATIC VALVE.
APPLICATION FILED JULY 10, 1914.
1,173,554.
Patented Feb. 29, 1916.
Fig. I.
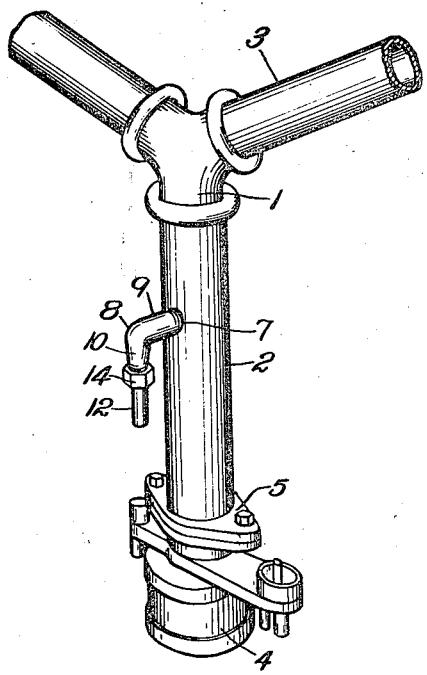
Fig. II.
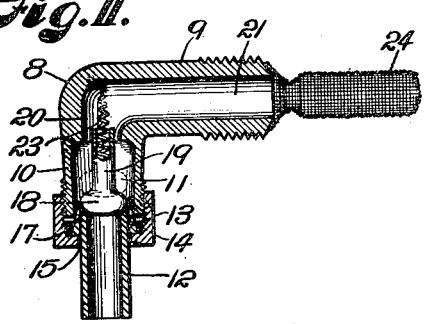
Fig. III.
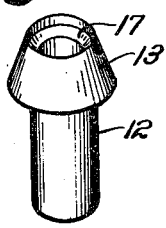
WITNESSES:
Lynn A. Robinson.
Arthur W. Capps.
INVENTOR
Mortimer Cahill.
BY
Arthur C. Brown.
ATTORNEY

UNITED STATES PATENT OFFICE.

MORTIMER CAHILL, OF KANSAS CITY, MISSOURI.

AUTOMATIC VALVE.

1,173,554.

Specification of Letters Patent. Patented Feb. 29, 1916.

Application filed July 10, 1914. Serial No. 850,128.

*To all whom it may concern:*

Be it known that I, MORTIMER CAHILL, a citizen of the United States, residing at Kansas City, in the county of Jackson and State of Missouri, have invented certain new and useful Improvements in Automatic Valves; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to automatic check valves, and has for its principal object, to provide a device of that character for automatically regulating flow of fluid through a conduit within which the valve is located, so that the flow may be automatically determined by varying requirements. In accomplishing this object, I have provided the improved details of structure hereinafter described and illustrated in the accompanying drawings, wherein:—

Figure I is a perspective view of a conduit equipped with my improved check valve. Fig. II is a central longitudinal section of the valve. Fig. III is an enlarged detail perspective of part of the valve housing, showing the valve seat.

Referring more in detail to the parts, 2 designates a conduit, having an aperture 7 within which one end of a valve housing 8 is mounted so that it may communicate with the interior of the conduit, the said housing comprising a tubular elbow having an arm 9 threaded into the conduit aperture 7, and having a downwardly directed arm 10 provided with a valve chamber 11.

Depending from the lower end of the downturned arm 10, is an intake tube 12, having a tapered head 13 located within the mouth of the valve chamber 11 and held tightly therein by a cap 14, which is threaded onto the end of the downturned arm, and has a central aperture 15 through which the tube 12 projects, so that the shoulder formed by the head 13 may seat in the bottom of the cap to press the tapered head to its seat and seal the valve chamber.

The upper end of the tube 12 is concaved to form a seat 17 having a valve 18, which is loosely mounted in the chamber 11 and has a plunger 19 projected upwardly into a neck 20 through which the valve chamber 11 communicates with the channel 21 in the horizontal arm 9 of the valve body to form a guide for the valve; the plunger being of such length that it may engage the top of the channel to limit the upward movement of the valve, and the chamber 11 being tapered upwardly to enlarge its area in the direction of the neck 20, so that as increased suction in the cylinders lifts the valve toward the maximum limit of its travel, the capacity of the chamber may be increased to provide the greater supply of air required under the conditions indicated by such increased suction.

While the weight of the valve and its plunger insures the receding of the valve when suction from the conduit is cut off or reduced sufficiently to be overcome by the weight of the valve, I prefer to provide the valve with a spring 23, which is adapted for engagement with the top of the valve channel 21 in advance of the contact of the plunger therewith to assist in retarding the opening travel of the valve and insure return thereof to its seat.

While the object of the valve might be accomplished without an atomizer, I prefer to attach a gauze or like filter 24 to the inner end of the arm 21, so that when the parts are assembled, the filter will be located within the conduit, and so that fluid taken in through the valve must be delivered into the conduit through the gauze or atomizer and thereby insure distribution of the fluid and the proper mixture thereof with the fluid in the conduit when the valve is used for a purpose requiring such mixture.

In using the device, presuming the parts to be constructed and assembled as described, when there is no suction in the conduit, the valve 12 will seat of its own weight and under tension of the spring to close the intake, so that no fluid is admitted to the conduit, but when suction is created in the conduit, such suction is communicated to the valve and tends to lift the valve 12, so that fluid may be admitted to the conduit.

It is apparent that as the valve is unrestrained, except by its own weight, and by its limiting contact with the valve conduit, as suction in the conduit increases, the valve is lifted thereby to further open the valve and admit a greater supply of fluid necessitated by the increased requirements of the engine; the enlargement of the valve chamber in the direction of the conduit serving to afford an increased channel area as the valve is raised. It is further apparent that, as the suction approaches the maximum, the spring will engage the top of the valve channel to assist the weight of the valve in retarding the opening travel, and that when the suction is sufficient, the end of the plunger will contact the top of the channel to positively limit the valve movement.

Having thus described my invention, what I claim as new therein, and desire to secure by Letters-Patent, is:

1. In a valve, a housing comprising a channel and a tapered valve chamber having a contracted neck at its larger end leading to the channel, an intake portion adapted for delivering to the smaller end of the chamber and provided with a seat, a valve freely movable within the chamber and having a head at one end adapted to seat in the intake portion, and a shank on said head adapted for sliding in said neck to guide the valve.

2. In a valve, a housing comprising a channel and a tapered valve chamber having a contracted neck at its larger end leading to the channel, an intake portion adapted for delivering to the smaller end of the chamber and provided with a seat, a valve freely movable within the chamber and having a head at one end adapted to seat in the intake portion, a shank on said head adapted for sliding in said neck to guide the valve, and a spring for yieldingly urging the valve to its seat.

3. The combination with a right angle valve housing having a delivery arm provided with a channel, and an arm having a tapered valve chamber and a restricted neck connecting the larger end of the chamber with said channel, an intake tube located in the smaller end of the valve chamber and provided with a valve seat, a valve having a head adapted to seat in said intake tube and a socketed shank projected into the said restricted neck, and a spring seated in said socket and bearing against the inner face of the channel in the first named arm.

In testimony whereof I affix my signature in presence of two witnesses.

MORTIMER CAHILL.

Witnesses:
   L. E. Coats,
   Lynn A. Robinson.